US009155985B2

(12) United States Patent
Yanda

(10) Patent No.: US 9,155,985 B2
(45) Date of Patent: Oct. 13, 2015

(54) SYSTEMS, DEVICES AND METHODS FOR HIGH VOLUME FLUID FILTERING

(71) Applicant: RTE Water, Inc., Los Gatos, CA (US)

(72) Inventor: Richard Frank Yanda, Los Gatos, CA (US)

(73) Assignee: RTE Water, Inc., San Jose, CA (US)

( * ) Notice: Subject to any disclaimer, the term of this patent is extended or adjusted under 35 U.S.C. 154(b) by 339 days.

(21) Appl. No.: 13/756,008

(22) Filed: Jan. 31, 2013

(65) Prior Publication Data

US 2013/0140248 A1    Jun. 6, 2013

Related U.S. Application Data

(63) Continuation of application No. PCT/US2011/046194, filed on Aug. 2, 2011.

(60) Provisional application No. 61/412,854, filed on Nov. 12, 2010, provisional application No. 61/370,363, filed on Aug. 3, 2010.

(51) Int. Cl.
*B01D 33/11* (2006.01)
*B01D 33/50* (2006.01)
*B01D 35/26* (2006.01)
*B01D 33/00* (2006.01)

(52) U.S. Cl.
CPC ............ *B01D 33/11* (2013.01); *B01D 33/0006* (2013.01); *B01D 33/50* (2013.01); *B01D 35/26* (2013.01); *B01D 2201/265* (2013.01); *Y02W 10/37* (2015.05)

(58) Field of Classification Search
CPC .... B01D 33/0006; B01D 33/11; B01D 33/50; B01D 35/26
See application file for complete search history.

(56) References Cited

U.S. PATENT DOCUMENTS

| 3,669,879 | A  | 6/1972  | Berriman |
| 3,950,249 | A  | 4/1976  | Eger et al. |
| 4,394,272 | A  | 7/1983  | Damerau |
| 5,593,378 | A  | 1/1997  | Dyck |
| 7,243,912 | B2 | 7/2007  | Petit et al. |
| 7,309,427 | B2 | 12/2007 | Kruse et al. |
| 7,314,564 | B2 | 1/2008  | Kruse et al. |
| 7,563,351 | B2 | 7/2009  | Wilkins et al. |
| 2002/0148779 | A1 | 10/2002 | Shieh et al. |
| 2003/0015469 | A1 | 1/2003  | Hedenland et al. |

(Continued)

FOREIGN PATENT DOCUMENTS

WO    WO 2012018762 A2 *  2/2012

OTHER PUBLICATIONS

Chapter II International Preliminary Report on Patentability for PCT/US2011/046194, dated Juy 22, 2013.*

*Primary Examiner* — David A Reifsnyder
(74) *Attorney, Agent, or Firm* — Robert Crownover

(57) ABSTRACT

Fluid filtration devices, systems and methods are disclosed. The device comprises a pump-filter hybrid system that uses rotational motion to produce pressure to drive liquid through filter elements, capturing filtrate in an isolated chamber of the device and rejecting separated solids into a second isolated chamber. The fluid filtration device, which can be configured to filter a wide variety of fluids, comprises: an influent input manifold; an impeller bowl and filter assembly configured to rotate about an axis; a barrier and routing configuration to catch and distribute filtrate; a barrier and routing configuration to catch and distribute rejected solids.

18 Claims, 5 Drawing Sheets

(56) References Cited

U.S. PATENT DOCUMENTS

| | | |
|---|---|---|
| 2003/0146158 A1 | 8/2003 | Mayer et al. |
| 2005/0252855 A1 | 11/2005 | Shieh et al. |
| 2006/0254979 A1 | 11/2006 | Koopmans et al. |

* cited by examiner

SYSTEMS, DEVICES AND METHODS FOR HIGH VOLUME FLUID FILTERING

CROSS-REFERENCE

This application is a continuation of PCT application serial number PCT/US11/46194 filed on Aug. 2, 2011, which claims the benefit of U.S. Provisional Application Nos. 61/370,363, filed Aug. 3, 2010, by Yanda entitled Fluid Filter for High Volume Industrial Applications, and 61/412,854 filed Nov. 12, 2010, by Yanda entitled Systems, Devices and Methods for High Volume Fluid Filtering which applications are incorporated herein by reference.

BACKGROUND OF THE INVENTION

1. Technical Field

The disclosure relates to the removal of solids from industrial, municipal, agricultural, or other wastewater or fluids.

2. Background

There is currently a severe shortage of usable water in many geographic locations. Moreover, the system for delivering, reclaiming or processing water for use is expensive and inefficient and achieved by a crumbling infrastructure. Current systems of industrial water filtration employ settling tanks or ponds that rely on large tracts of land and are only partially effective at particulate removal or dead end filtration which are very high cost and low volume.

It has been said that "water is the oil of the $21^{st}$ century" because of huge demand and finite supply. Although it is estimated that greater than 75% of the earth's surface is covered by water, over 96% of water is ocean. Nearly 70% of freshwater is trapped in ice caps, glaciers and permanent snow. That leaves only a few percent as fresh water for human use (See, www.earthobservatory.nasa.gov.) Salt water, which represents the vast majority of water, requires expensive and energy intensive desalination processes before it is can be used for drinking.

The U.S. alone has more than 97,000 water treatment facilities. The projected annual growth rate for water treatment is 5%-8% over the next decade. Furthermore, the Environmental Protection Agency (EPA) has projected that this increase will come primarily from population growth and urban expansion. Because of increased demand, there is recognized a need to upgrade equipment and infrastructure used in the water treatment industry, particularly the wastewater treatment industry. Equipment installed under the Clean Water Act of 1972 is currently approaching the end of its projected lifecycle. In addition, the water treatment standards mandated by the EPA do, from time to time, become more stringent.

To make matters more complex, the issues pertaining to water as a resource and energy reserves are intertwined on many levels. An April 2005 Lawrence Berkeley National Laboratory Study estimated the electricity potential from methane produced by the anaerobic digestion of wastewater biosolids, from Industrial, Agriculture, and Municipal facilities. See E O. Lawrence Berkeley National Laboratory Study, April 2005, LBNL-57451. The results of the study demonstrated that, notwithstanding energy requirements to process water, the processing of water can itself be a source of energy Traditionally, conventional waste water treatment facilities 10 are constructed to take in wastewater as influent and process it through a variety of screenings and treatments, as illustrated in FIG. 1, prior to the releasing the effluent to the ocean, bay, river or lake. Wastewater 12 that passes through the bar screen and the grit screen 14 is subjected to primary treatment in a large sedimentation lagoon or tank 20. The sedimentation tank 20 enables particle settling or sedimentation 22. The sedimentation tank has an influent which travels in at a very slow flow rate to an opposing end where it exits as effluent 24. During the process of traveling from the inlet (as influent) to the outlet (as effluent), particles settle out in a settling zone to form a sludge or sedimentation 22 at the bottom of the sedimentation tank 20. A variety of techniques can be employed to remove the particles from the sedimentation tank 20 that would be known to those skilled in the art.

The effluent 24 flows from the sedimentation tank 20 to a second sedimentation lagoon 30 where bubblers 32 aerate the influent and flocculants are added as part of a secondary treatment process. After secondary treatment the effluent 34 is often treated with a final disinfectant step by placing into a chlorination basin 40 prior to emitting the final effluent 42 into the ocean, bay, river or lake 50.

Conventional treatment technologies include, for example, a pumped diffusion flash mixer for chemical addition, flocculation basin, sedimentation basin and granular medium filter. The residuals from the wastewater treatment plant are returned to the source or stored in ponds. For example in arid locations, drying ponds are sometimes used. More often, mechanical processing is employed in conjunction with the residuals to reduce the volume of the residuals. Yet another treatment mechanism that can be used after primary treatment is provided by G.E. Water & Processing Technologies and includes ZeeWeed based membrane bioreactor (MBR). The ZeeWeed MBR is a basic production train that consists of a biological reactor, membrane basin, permeate pump, air blowers and automated control equipment. The production trains are simply expanded to meet capacity requirements as needed. Membrane bioreactor systems offer a significantly smaller footprint and simplified operation than the comparable conventional activated sludge systems shown in FIG. 1. However, the bioreactor systems are still quite large.

Currently there are several important issues facing the design of wastewater treatment facilities for which there has been an insufficient solution. First, most wastewater treatment facilities consume a significant amount of energy during operation. Second, wastewater treatment facilities typically require a substantial amount of land. Third, wastewater treatment facilities often emit an unpleasant odor which can make them undesirable to place strategically in an urban setting, notwithstanding the space requirements. Fourth, as much as 40% of the treated water is lost to evaporation during processing.

Industrial wastewater processes parallel the municipal systems outlined above but usually incorporate only one or two processes of those outlined above. For example, food processors need to recover and reuse fruit and vegetable pre-wash water but must satisfy strict EPA regulations to do so. Most food processors do not have an economical choice for recovering water for reuse and suffer higher costs to buy more water as well as local regulatory limitations on the amount of water that might be available from their local municipal water source. The effluent from these plants must also conform to EPA rules and the settling pond is a common solution. However, little or no water reclamation is possible.

Dead-end filter systems for large scale processing are large, consume significant amounts of energy and are expensive to build and maintain.

Systems previously developed include, for example, U.S. Pat. No. 3,950,249 to Eger et al. for Sanitary Waste Treatment Plant, U.S. Pat. No. 7,243,912 to Petit et al. for Aeration Diffuser Membrane Slitting Pattern, U.S. Pat. No. 7,309,427 to Kruse et al. for System for Treating Liquids. U.S. Pat. No.

7,314,564 to Kruse et al. for Method for Treating Liquids, U.S. Pat. No. 7,329,358 to Wilkins et al. for Water Treatment Process, and U.S. Pat. No. 7,563,351 to Wilkins et al. for Water Treatment System and Method; U.S. Patent Pubs. US 2002/0148779 A1 to Shieh et al. for Methods and Apparatus for Biological Treatment of Aqueous Waste, US 2003/0015469 A1 to Hedenland et al. for Modified Intermittent Cycle, Extended Aeration System (MICEAS), US 2005/0252855 A1 to Shieh et al. for Methods and Apparatus for Biological Treatment of Aqueous Waste, and US 2006/0254979 A1 to Koopmans et al. for Mixer and Process Controller for Use in Wastewater Treatment Processes.

What is needed, therefore, are systems, devices and methods for processing water which have a smaller footprint, reduce the amount of water lost to evaporation, provide for odor control, which have a reduced energy consumption and which are affordable and scaleable for non-municipal applications.

SUMMARY OF THE INVENTION

An aspect of the disclosure is directed to fluid processing systems. Suitable fluid processing systems comprise: first bowl, with a bottom surface and a side wall having an inner surface and an outer surface defining an enclosure wherein the side wall extends from the bottom surface at an angle from 10-20° from the vertical, having at least one filter element positioned in the side wall of the first bowl in fluid communication between an interior of the first bowl and an exterior of the first bowl; an input manifold adapted and configured to receive an influent fluid and to deliver the influent to an area adjacent the bottom surface of the first bowl; a partition adapted and configured to isolate an influent filtrate from an influent solid; and a drive system adapted and configured to control a rotational movement of the first bowl. In at least some configurations, at least one pump vane is positioned in a bottom surface of the first bowl. The pump vane is adapted and configured to propel the influent outward from a central axis when the first bowl is rotating during operation. Additionally, a back-flush system having a spray nozzle and pump assembly to spray fluid through the filter from an exterior of the first bowl to the interior of the first bowl. The back-flush system can be configured to operate continuously or intermittently, as desired. In some configurations of the system, one or more secondary bowls are provided which are nested around the first bowl and a common axis of rotation. The use of multiple bowls which are nested facilitates processing the influent in stages. In some configurations, the one or more nested secondary bowls have an angle from a bottom surface to an upper edge of the side surface that is the same as the first (inner) bowl. However, in other configurations, the one or more nested secondary bowls can be configured to have an angle from a bottom surface to an upper edge of the side surface that is different than the first (inner) bowl. An enclosure can also be provided that is adapted and configured to house or isolate the system from an environment wherein the enclosure further comprises one or more input/output interfaces. The filter elements can be configured to provide a filtering capacity of from several hundred micrometers to sub-micrometer. Where nested bowls are used each nested bowl can be provided with different filtering capacity to provide a changing filtering granularity as influent to the system passes from the first filtering stage to later filtering stages. Additionally, in some configurations, the at least one filter elements is adapted and configured to filter in a single stage or multiple stages. The one or more filters can be formed from one or more of plastic screen, metal screen, microfiber material, woven fibers, sintered metal, and compressed paper.

Another aspect of the disclosure is directed to methods of filtering fluid. The methods of filtering comprise: introducing an influent into a fluid processing system comprising a first bowl, with a bottom surface and a side wall having an inner surface and an outer surface wherein the side wall extends from the bottom surface at an angle from 10-20° from the vertical, having at least one filter element positioned in the side wall of the first bowl in fluid communication between an interior of the first bowl and an exterior of the first bowl, an input manifold adapted and configured to receive an influent fluid and to deliver the influent to an area adjacent the bottom surface of the first bowl, a partition adapted and configured to isolate an influent filtrate from an influent solid, and a drive system adapted and configured to control a rotational movement of the first bowl; rotating the first bowl; and creating a pressure to force a fluid component of the influent through filter elements while pushing a solid component of the influent over a top rim of the bowl. Additionally, the methods can further comprise one or more of each of the steps of propelling the influent outward by a pump vane located on the bottom surface of the bowl, spraying a fluid other than the fluid component of the influent through the filter, filtering a fluid component of the influent through one or more nested bowls, and isolating the system from the environment.

Still another aspect of the disclosure is directed to fluid processing devices. The fluid processing devices comprise: a first bowl having at least one filter element positioned in the side wall of the first bowl in fluid communication between an interior of the first bowl and an exterior of the first bowl; an input manifold adapted and configured to receive an influent fluid and to deliver the influent to an area adjacent the bottom surface of the first bowl; at least one pump vane positioned in a bottom surface of the first bowl wherein the pump vane is adapted and configured to propel the influent outward from a central axis when the first bowl is rotating; and a drive system adapted and configured to control a rotational movement of the first bowl. A bottom surface of the bowl and a side wall of the bowl have an inner surface and an outer surface and further are configurable such that the side wall extends from the bottom surface at an angle from 10-20° from the vertical. A back-flush system can also be provided wherein the back-flush system has at least one spray nozzle and pump assembly to spray fluid through the filter from an exterior of the first bowl to the interior of the first bowl. One or more secondary bowls can also be provided which are nested around the first bowl and a common axis of rotation adapted and configured to cause the influent to be processed in stages. In some aspects, the one or more nested secondary bowls have an angle from a bottom surface to an upper edge of the side surface that is the same or different from the angle of the first bowl. Additionally, some aspects can be configured to include an enclosure adapted and configured to isolate the system from an environment wherein the enclosure further comprises one or more input/output interfaces. Suitable filter elements for use in the devices typically have a filtering capacity of from several hundred micrometers to sub-micrometer. In at least some configurations, the at least one filter elements is adapted and configured to filter in a single stage or multiple stages. The one or more filters can be formed from one or more of plastic screen, metal screen, microfiber material, woven fibers, sintered metal, and compressed paper. A refrigeration system adapted and configured to change a temperature of at least one of the influent or the one or more filters can also be provided in at least some configurations of the devices.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
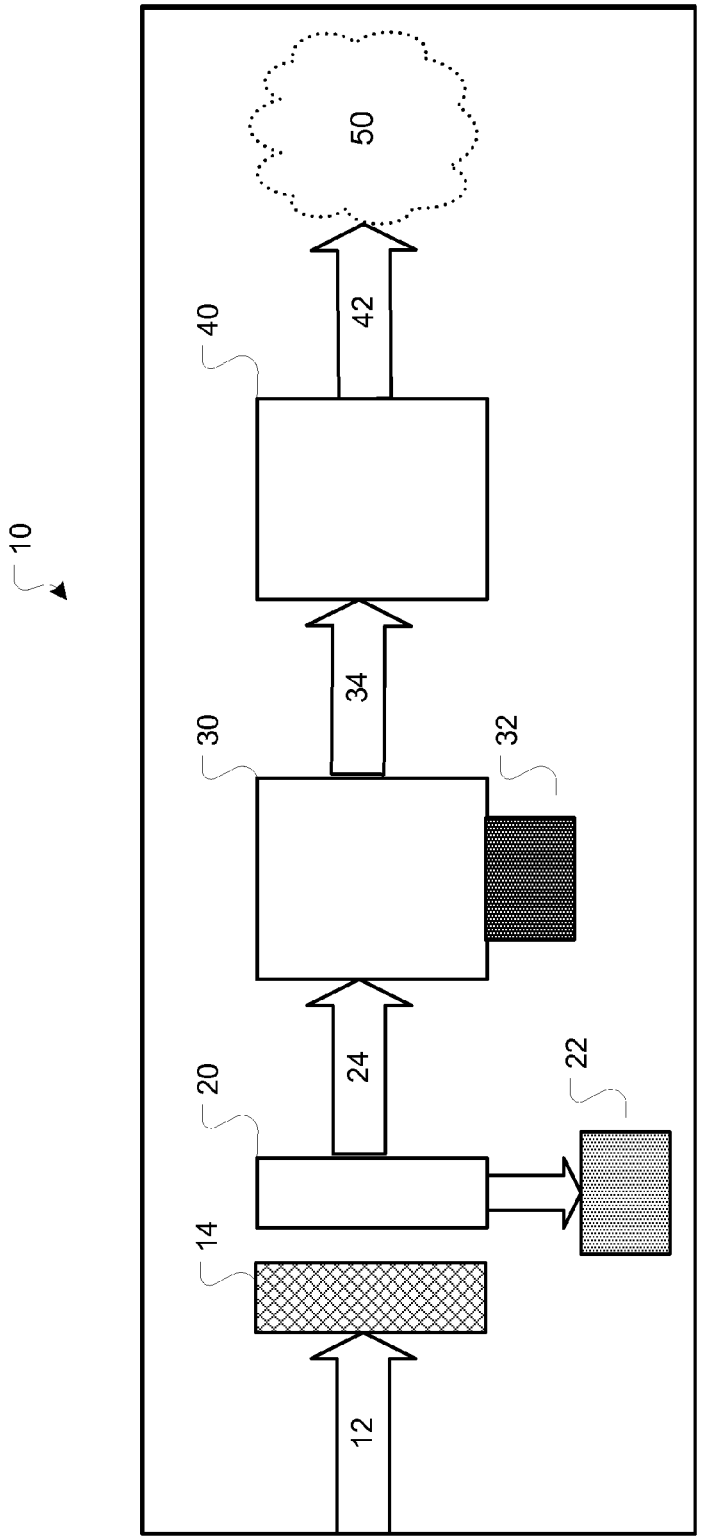
FIG. 1 is an overview of a system for water treatment according to current practices.

The systems, devices and methods disclosed herein are adapted and configured to remove suspended solids from large volumes of water at high rates of flow by providing a cross-flow membrane filtration system that allows for continuous operation with no back-flush downtime. Additionally the systems and devices can achieve the methods disclosed using a device having a two-dimensional footprint of, for example, 50 square feet (e.g., 7.1 ft×7.1 ft) or less instead of the roughly ⅓ acre (14520 square feet or 120.5 ft×120.5 ft) currently used for the process outlined in FIG. 1 and discussed above. Typical machines will be approximately 5 feet in height. As will be appreciated by those skilled in the art, the systems can be combined modularly to accommodate larger systems processing volumes greater than 250,000 GPD. Scaled-up versions, processing several millions of gallons per day in a single machine, will be proportionately larger. In addition to having a footprint that is less than 1% of the footprint of the municipal systems shown in FIG. 1, the systems, devices and methods for processing water reduce the amount of water lost to evaporation, provide for odor control, and have an overall reduced energy consumption.

As will be appreciated by those skilled in the art, a filter can be provided with the systems and devices that will achieve better functionality for removing suspended solids than settling ponds and/or pools. Thus, there is approximately a 60% increase in the amount of recovered water, greater than a 50% reduction in energy consumption for the process, and greater than a 70% reduction in the amount of land needed to perform the process. Water consumption is reduced by 80% or more for some applications such as food processors. Recovery of bio-digestible material for many applications formerly using settling tanks will be increased by over 50% because of elimination of losses to environmental bacteria. Capital cost savings are 30% or more and operating costs savings can exceed 50%.

The disclosure enables a method of creating pressure to drive high volumes of liquid through fine filtration screen openings while removing rejected solids in a fashion that allows adjustment of a state of dryness of the solids so the solids are easily and inexpensively disposed. The result is achieved by combining the elements of a pump and a filter into a hybrid device in such a way that energy consumption is minimized and effluent is easily removed. The processing is continuous with no interruptions for separate cleaning or back flushing of filters found in virtually all dead-end filter systems and is well suited for an industrial environment. Periodic maintenance schedules only require infrequent replacement of consumables.

I. Systems

Fluid filtering devices and systems adapted and configured to achieve high volume industrial applications which filters liquids while extracting solids or high viscosity fluids is provided. Rotational motion is used to produce a target pressure of about 2.5 psi that facilitates the movement of water through one or more filter elements associated with the devices and systems. Effluent is ejected and carried over a top edge of a bowl-like rotator(s) that can comprise the filter assemblies. Filtrate and effluent can be separately channeled out of the machine.

Figure 2:
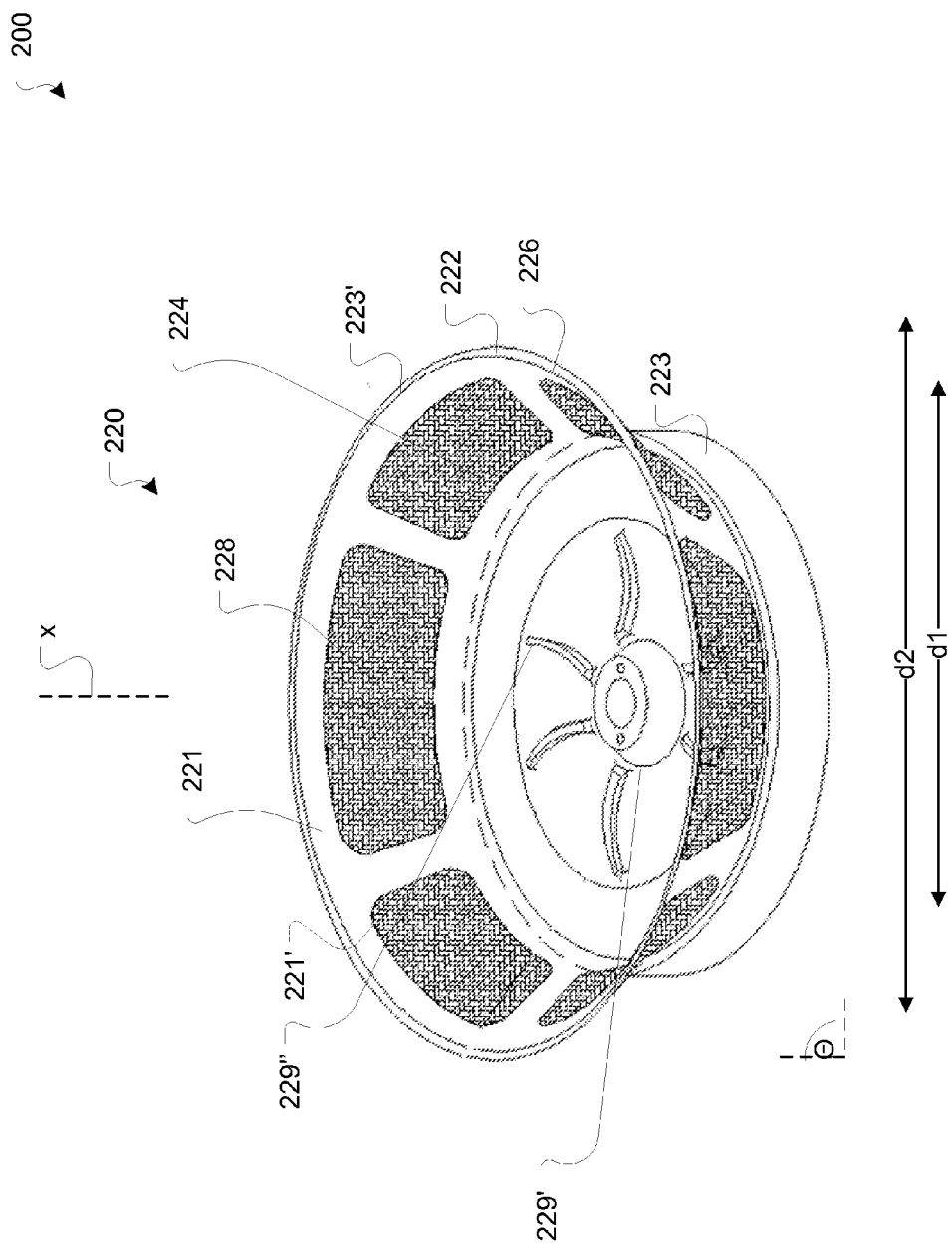
FIG. 2 is perspective view of a system of the disclosure.

FIG. 2 is a perspective view of a system or device 200 according to the disclosure. An outer tank or enclosure (not shown) is configured to house or contain an inner tank. The outer tank or enclosure isolates the system from the surrounding environment and can be connected to, a variety of input/output systems. The outer tank or enclosure has one or more side walls and a bottom surface. The one or more side walls and bottom surface form a receptacle into which additional system components can be placed. The configuration of the outer tank or enclosure, can be cylindrical, rectangular, square, or any other suitable shape or geometry for a particular installation. A cover (not shown) may also be provided, if desired. Additionally, the outer tank can be formed from a plurality of pieces which are assembled into the desired configuration, or can be formed from a single piece which is, for example, molded into a shape suitable to house the remaining system components.

Figure 3:
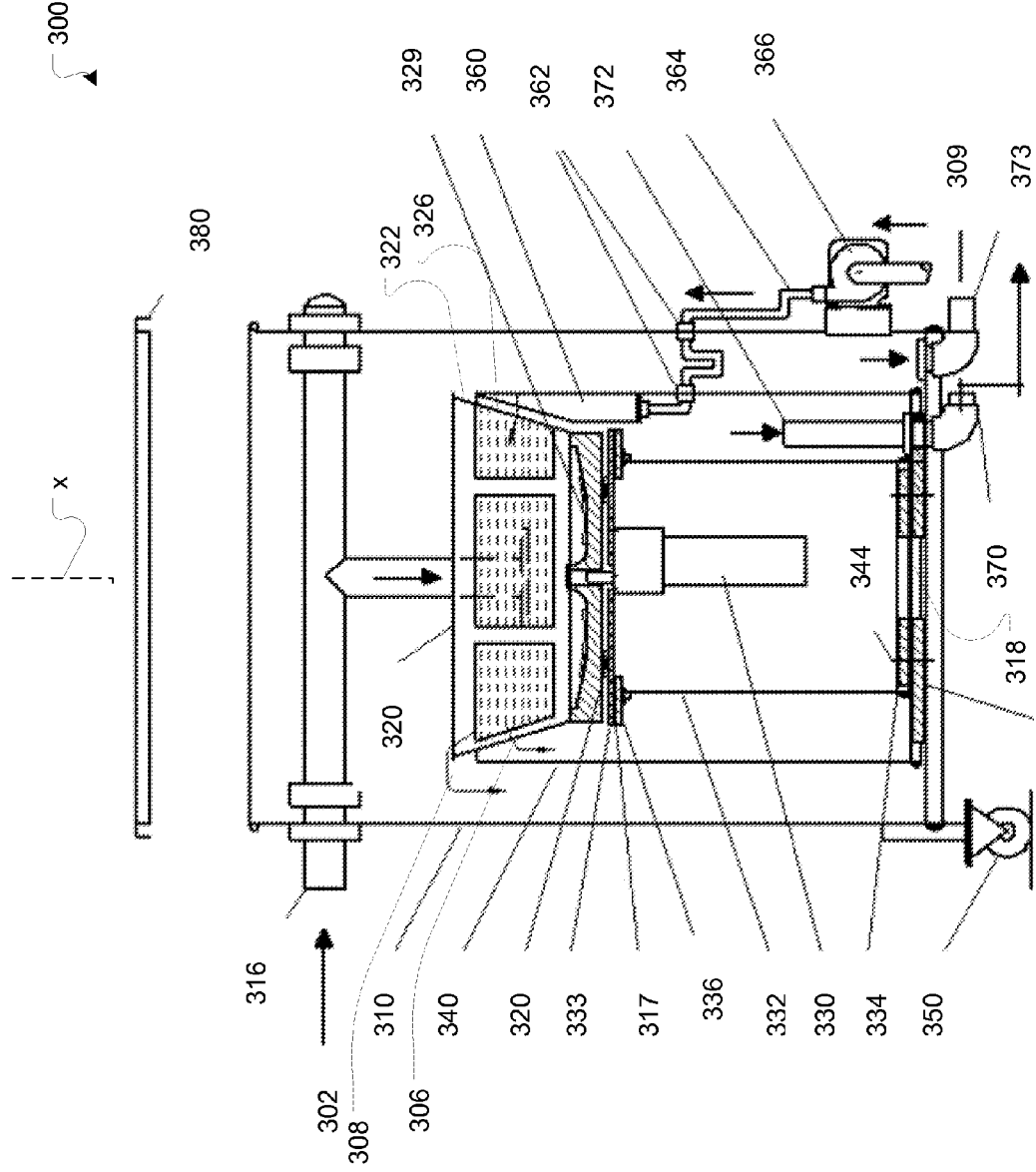
FIG. 3 is a side view and cross-section of a system of the disclosure.

Positionable within the outer tank is an inner tank or bowl 220. The inner tank or bowl 220 has a side wall 222, a bottom surface 224, and an inner surface 221 and outer surface 221'. The inner tank or bowl 220 is configurable to fit within the outer tank such that the inner tank 220 can rotate about an axis x when in use. The side wall 222 of the inner tank or bowl 210 is configurable such that it flares from a first diameter d1 at its lower edge 223 to a second diameter d2, larger that the first diameter, at its upper edge 223'. Geometrically, the inner tank or bowl 220 has a trapezoid profile in cross-section (as illustrated in FIG. 3). In some configurations, the inner tank or bowl is configurable such that the profile is a truncated cone, parabola, or spherical bowl. Additionally, one or more apertures 226 can be provided in the side wall 222 which are configurable to provide a filter 228. The one or more filters 228 provided in the one or more apertures can be formed integrally with the side wall 222 such that the one or more filters 228 is a constituent part of the side wall 222 or is incorporatable in such a manner that the one or more filters 228 act in a unified manner with the side wall 222 when the inner tank 220 is rotating about axis x. The one or more apertures 226 can be configured to provide a flange and lip configuration which is adaptable to receive a filter that slides in to cover the aperture.

One or more impeller vanes or pump vanes 229 can be formed on the bottom surface 224 of the inner tank 220. The one or more impeller vanes 229 can be formed from the bottom surface 224 of the inner tank such that the impeller vane 229 is a portion of the bottom surface that is raised away from the bottom surface. Moreover, the impeller vanes 229 can be formed such that one end 229' is positioned near a central axis of the inner tank 220 while the second end 229" is near the side wall 222 of the tank 220. The shape of the impeller vane 229 can be straight, curved, s-shaped, or any other suitable shape. The input manifold is positionable partially extending downward into the inner tank 220 which features an attachment point for the impeller shaft from the drive motor at its bottom surface.

Turning now to FIG. 3, a cross-sectional side view of the system illustrated in FIG. 2 is depicted. The system 300 has an outer system container tank 310 having an inner surface and an outer surface and an inner tank 320 having an inner surface and an outer surface. As described above, the inner tank 320 has a side wall 322 and a bottom surface. The inner tank 320 is configurable to fit within the outer tank 310 such that the inner tank 320 is rotatable about an axis x when in use. The side wall 322 of the inner tank 310 is further configurable such that it flares from a first diameter d1 at its lower edge to a second diameter, larger that the first diameter, at its upper edge (as shown in FIG. 2). An angle $\Theta$ between the lower edge and the upper surface ranges from 10-20° from the vertical (x) axis.

Additionally, one or more apertures 326 can be provided in the side wall 322 which are configurable to provide a filter. The one or more filters provided in the one or more apertures 326 can be formed integrally with the side wall 322 such that the one or more filters is a constituent part of the side wall 322 or is incorporatable in such a manner that the one or more filters act in a unified manner with the side wall 322 when the inner tank 320 is rotating about axis x. One or more impeller vanes can be formed on the bottom surface of the inner tank 320. The impeller vanes 329 are adaptable and configurable to propel influent received in the inner tank 320 outward when the bowl is rotating.

Fluid is delivered to the inner tank 320 via an input manifold 316. The inner tank 320 is positioned on a bearing 318 which can be one or more supports that are provided to locate or revolve around a reciprocating shaft which has is controlled by a drive system which can include motor, a controller and a linkage assembly connected to a drive shaft of the rotator assembly.

The inner tank 320 is positionable in communication with a motor contained within a motor housing. Features and components of motors would be known to those skilled in the art and are not described herein to avoid obscuring the disclosure.

As depicted in FIG. 3 the motor 330 is positioned adjacent an outer surface of the inner tank 320 while being housed within the outer tank 310. However, as will be appreciated by those skilled in the art, other positions of the motor are possible provided power from the motor is communicated to the inner tank 320 to achieve rotation of the inner tank 320 about axis x when the motor is activated. The motor 330 can be any suitable motor or machine that transforms power from some other form into mechanical energy. Moreover, motors can be powered by any suitable source, including direct current (DC) or alternating current (AC). In at least some configurations, the motor is a variable speed motor wherein the speed is manually or semi-automatically variable. Where the speed is automatically controllable, an on-off switch is provided which, when activated, provides instructions to the motor to operate for one or more times at one or more speeds. Thus, the system is configurable such that a user can turn the device on (e.g., turn on power) and then select a speed at which the inner tank 320 rotates or the user turns on the device wherein the system determines a protocol for inner tank 320 rotation. In some configurations, one or more of solar power, wind power, or battery power sources may be used to facilitate use of the device and system in areas where access to an electrical grid is not available.

As shown in the configuration illustrated in FIG. 3, the inner tank 320 is positioned on an upper surface of the motor 330. A seal 334 and/or spacers are provided between the inner tank 320 and the motor 330 which is configurable to prevent flow of one or more of fluid and gases into the motor housing. A flange 336 can be provided on the upper surface of the motor housing to facilitate coupling the motor 330 to the inner tank 320. For example, a mounting plate can be positioned between the upper surface of the motor housing the bottom exterior surface of the inner tank. In at least some configurations, a side barrier 340 is positionable between the exterior surface of the inner tank 320 and within the outer tank 310.

As depicted, the motor 330 is positioned within a side barrier 340. One or more seals can be provided which allow the motor to be anchored to the outer tank 310 with one or more bolts 344 which pass through apertures (not shown) in the bottom surface of the motor housing, the side barrier 340 and the outer tank 310. A suitable fastener (not shown), such as a nut, can be used to secure the one or more bolts from a position exterior to the outer tank 310. Additionally, one or more spacer seals can be provided which are positioned between an external surface of the side barrier 340 and an inner surface of the outer tank 310. In at least some configurations, the entire assembly is provided with a movement mechanism such as one or more wheels 350.

A sprayer assembly or spray nozzle 360 forms part of a back-flush system and is longitudinally positioned adjacent at least a portion of the inner tank 320 within the side barrier 340. The sprayer assembly 360 has one or more apertures (not shown) positioned to face the exterior surface of the inner tank 320 to provide high pressure fluid therethrough. The spray nozzle is adapted and configured to spray fluid backward through the one or more filters of the inner tank which clears or substantially clears the filter holes or apertures. The sprayer assembly 360 is configurable such at a lower end it bends at an angle substantially perpendicular to longitudinal position within the side barrier 340. The sprayer assembly 360 is in fluid communication with one or more pass-throughs positioned along a substantially perpendicular section that passes through the side barrier 340 wall and then the exterior tank 310 wall. A back flush assembly 364 is provided in communication with the sprayer assembly 360, along with a back flush pump 366 and back flush plumbing. Additionally, an outlet port 370 is provided in a lower surface of the outer tank 310 that facilitates removal of materials. Additionally, a standpipe 372 can be provided which provides fluid communication via an outlet port 373 from the interior of the side barrier 340 and the exterior of the outer tank 310. The entire assembly can also be configured to include a cover 380 or lid which is adapted and configured to fit over the opening of the exterior tank 310.

Figure 4:
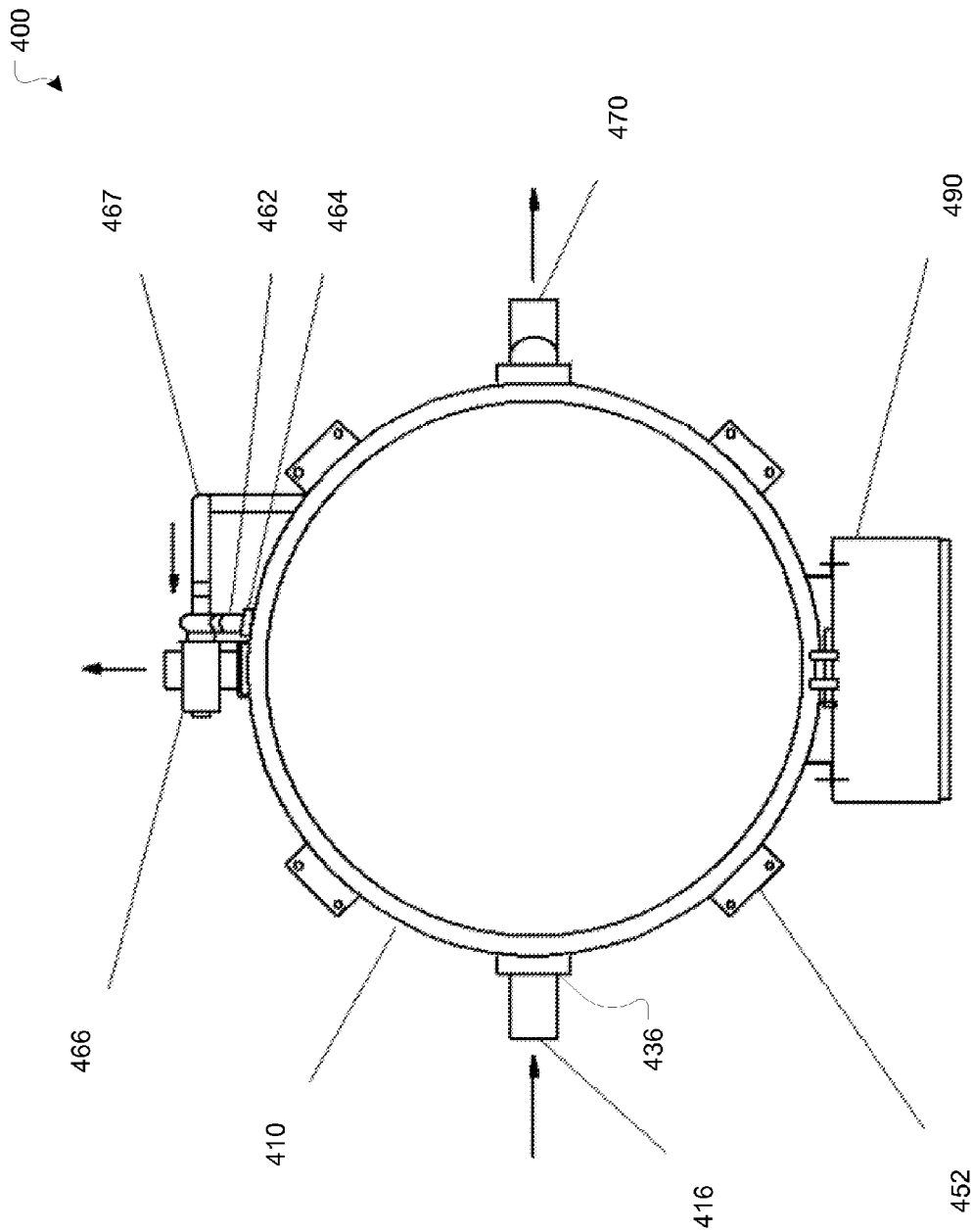
FIG. 4 is a top view of a system of the disclosure.

As shown in FIG. 4 the system 400 has an outer tank 410 which is positioned on a plurality of wheels contained within a wheel housing 452. The outer tank 410 has a pass through 462 and back flush assembly 464 which is external to the outer tank 410. Back flush plumbing 467 and back flush pump 466 is also provided. An input manifold 416 is in fluid communication with an interior of the system 400 and is positionable on one side of the outer tank 410 with an outlet port 470 in fluid communication with an exterior of the system 400 on an opposing side of the outer tank 410 as depicted. Although the input manifold 416 and outlet port 470 are illustrated on a single axis, they need not be positioned on the same axis.

Figure 5:
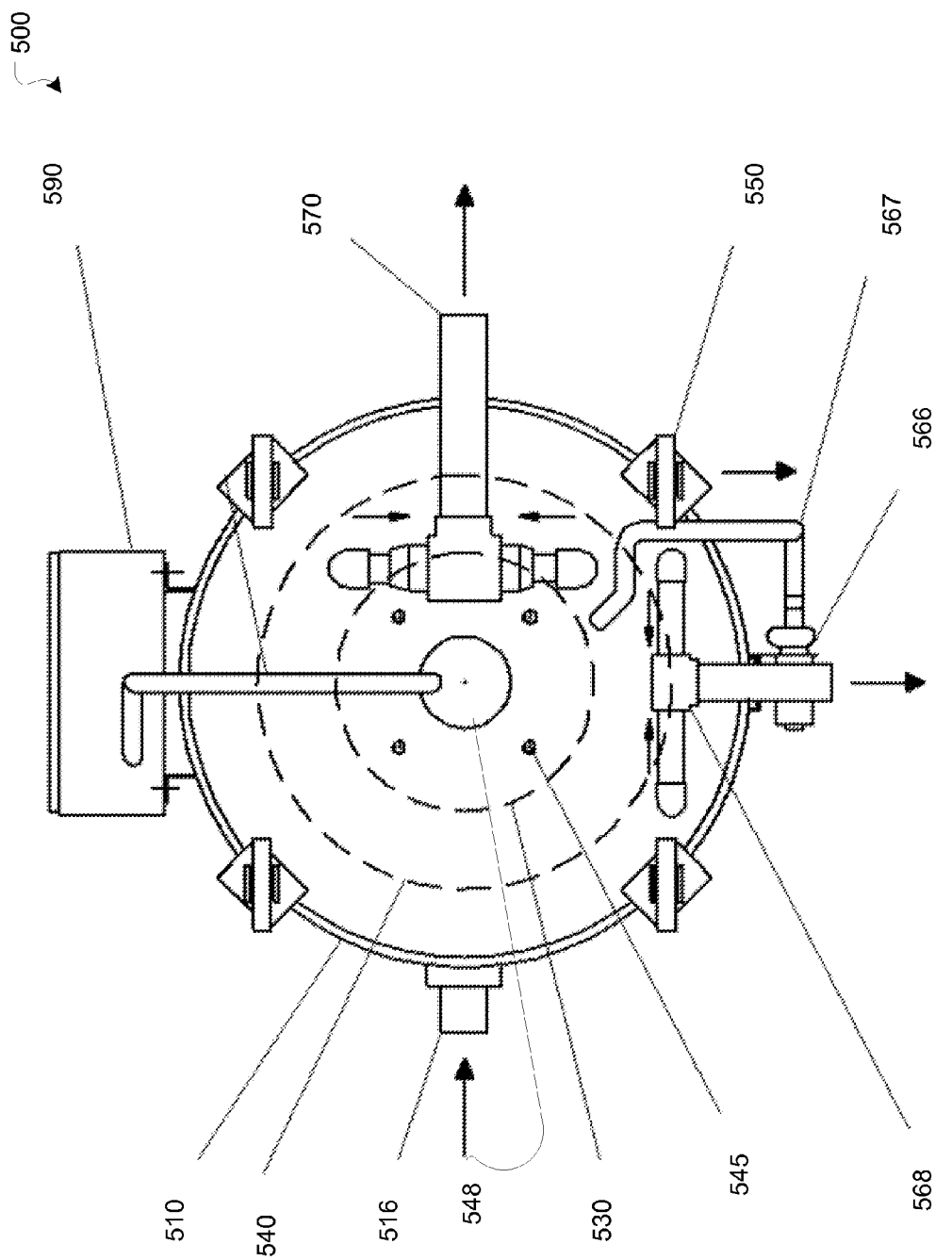
FIG. 5 is a bottom view of a system of the disclosure.

Additionally, an electrical interface 490. Flanges 436 can also be provided for attachment of the input manifold 416 and the outlet port 470. As will be appreciated by those skilled in the art, the system can be configured such that an input is provided on one side of the device and an output is provided in another location on the device (illustrated here as the opposing end). However, the system is also configurable to provide feeds at more than one location Turning now to FIG. 5, which is a bottom view of a configuration of the system 500 shown in FIG. 2 from the perspective of the exterior of the outer tank 510. From this illustration, additional details of connection of output ports can be appreciated. The outer tank 510 houses, for example, the side barrier 540 (which surrounds the inner tank, not shown) and the motor 530. An input manifold 516 delivers fluid into the system. Two outputs 570, 566 are provided to facilitate processing a volume of filtrate and rejected sludge through the sludge exit plumbing 568. Both sets of exit apertures can be tied together and routed to a single output pipe. Additional details of suitable mechanisms for connecting the back flush pump 566 and the back flush plumbing 567 into the output system 500 is shown. Note that the back flush pump 566 is not tied to the sludge exit plumbing 568 that is underneath it. FIG. 5 also illustrates shows the four bolts shown in other figures secured by female threaded bolts 545. A central access aperture 548 is surrounded by the one or more bolts. Electrical interface 590 can be provided exteriorly to the device and in electrical communication with the motor 530. A pipe feeding the back flush nozzle 560 is also provided. Optional wheels 550 can be provided to facilitate movement of the device.

A system as illustrated in FIGS. 2-5 and described above can, according to this disclosure have parameters outlined in Table 1:

TABLE 1

| Feature | Ranges | | |
|---|---|---|---|
| Flow Rate | 2,500 GPH | 4000 GPH | 83,300 GPH |
|  | 60,000 GPD | 100k GPD | 2 MGD |
| Diameter (top of | 50 cm | 55.6 cm | 200 cm |
| filter assembly) | 20 in | 21⅞ in | 80 in |
| Sidewall height | 20 cm | 20 cm | 60 cm |
|  | 8 in | 8 in | 24 in |
| Sidewall Slope (from the vertical) | 10° | 15° | 20° |
| Filter Area (one | 2000 cm² | 2335 cm² | 4.6 m² |
| or more filters) | 350 in² | 362 in² | 6,000 in² |
| Rate of Rotation | 75 RPM | 150 RPM | 300 RPM |

One or more quick-change filter elements can also be designed for easy replacement; such quick change filter elements can be provided in a kit form to purchasers. Filters can, for example, be 11 micron nominal nylon filters. Each of the filter components can have the same filtering capabilities (e.g., size of apertures) or different filtering capabilities, such that at each stage increased filtering is achieved. Moreover the sidewalls of each of the bowls can have the same angle or different angles. Filter elements for any of the bowls, nested bowls, device or system can be sized from several hundred microns down to sub-micron openings and can be provided in single stage or multiple stage configurations. Filters can be made from plastic screen (such as nylon or polypropylene), metal (such as stainless steel) or sintered metal, microfiber material (such as fine polyester fibers or fine polyamide fibers (e.g., nylon, Kevlar®, Nomex®), weighing less than one denier per filament, available from, for example, DuPont), woven fibers, High-Efficiency Particulate Air "HEPA" filters (e.g. filters comprising a mat of randomly arranged fibers, such as fiberglass, which is configured to remove 99.97% of particles greater than 0.3 microns from the air that passes through it), and compressed paper.

The side wall slope of the inner tank can range from zero to forty-five degrees from the vertical, with a preferred side wall slope of approximately 10-20°, and more preferably, 14-16°, and even more preferably 15°. Side wall configurations utilizing the parabolic or circular cross section are used in other embodiments of the invention. When in use, the input manifold helps disperse the influent and reduce splashing. The benefit of the side wall slope is the cross-flow filtration method that helps keep the filters from clogging. As the effluent climbs the sides and is rejected over the top, the filtrate passes through the filters. Additional continuous or near continuous back flushing is included to further facilitate filtering capabilities so the system can operate with minimal interruption.

Filter screen material can be used in a variety of sizes. For example, nylon filter screen material can be obtained in the sizes shown in Table 2:

TABLE 2

| nominal | % open area | thread diameter |
|---|---|---|
| 210 μm | 33% | 155 μm |
| 165 | 44 | 83 |
| 64 | 44.5 | 33 |
| 48 | 31 | 38 |
| 37 | 24 | 39 |
| 36 | 27.5 | 33 |
| 20 | 14 | 34 |
| 11 | 6 | 36 |
| 10 | 2 | 28 |
| 5 | 1 | 37 |
| 1 | 1 | 37 |

Similar measurements are available in stainless steel, polyester and other polymer screens, as well as membranes and sintered metals.

Single stage models are used for special applications, as discussed above with respect to FIGS. 2-5. These prototypes proved the concept and are a testing vehicle for product improvement and up-scaling.

As will be appreciated by those skilled in the art, the system is configurable to provide one or more nested filter bowl or assemblies which can further be configurable to rotate in the same direction or opposite direction of the inner tank 320. The nested bowl assemblies are configured around a common axis and are further configurable to allow the filtrate to be processed in stages. Each nested bowl can further be adapted and configured to have filter components similar to inner tank 310 described above.

Typically, the multi-stage versions gradually reduce the size of the openings in the filters in successive stages, moving outward from the axis of rotation, to help prevent clogging. Removal of the largest particles by the inner-rotator filters (with larger openings) rejects the bulk of the solids. This technique reduces the clogging tendency of filters with very small openings found in the outer-most rotator (farthest from the axis). However, as will be appreciated by those skilled in the art, staged processing is not limited to the description provided.

Where significant concentrations of suspended solids (especially colloidal material) are present in the influent, an electrical potential can be applied to the rotator bowl and metallic filter elements to assist in suspended solids removal.

In many cases, a negative charge can be used to repel the suspended solids, keeping them away from the filter elements and sides of the rotator in order to force them to stay mixed with the wet solids. Removal of suspended solids is an aid to purifying the filtrate and reducing the BOD. Additionally, a refrigerant unit can be provided to control the temperature of, for example, the influent.

The fluid filter can accommodate very large quantities of influent. Applications for this tool require processing quantities ranging from a few tens of thousands of gallons per day (GPD) up to many millions of GPD. Machines are sized for the application and are modularized to accommodate periodic maintenance (PM) schedules, planned variations in capacity such as gradually increasing demand, and unplanned surges of influent.

The fluid filter can be used in many different applications where wet solids must be removed from water or other liquid filtrate. The municipal wastewater treatment industry, the agricultural manufacturing, processing or farming sectors and industrial applications such as paper manufacturing or oil drilling can all benefit from the use of this technology.

II. Methods

Methods of the disclosure are readily apparent from reviewing the description of devices, systems and examples. Methods include, for example, rotating one or more bowls with at least one filter element, propelling influent outward during the rotation process. Propelling can be enhanced by, for example, use of pump vanes located within the inner most bowl. Rotational motion creates a pressure sufficient to force fluid through the filter elements and pushes solids over the top of the rim of the bowl. One or more nested filtration elements can be used to achieve increasing filtration quality. Filter holes can be kept clean using a back-flush system, such as a spray nozzle and pump assembly. A turbulent and laminar flow of liquid can be achieved across the face of the filter elements to afford a continuous cleaning effect on the face of the filters. The laminar flow generally allows a series of liquid cylinders to flow in a direction where a center portion flows at a faster rate than an outer portion. In contrast the turbulent flow vortices, eddies and wakes make flow unpredictable. Some applications benefit from laminar flow while others are aided by introducing some small turbulence as defined by the composition of the influent, the desired viscosity of the sludge and other characteristics of the particulates that tend to clog the filters. Only filtrate water is utilized to feed the back flush assembly. The system is adapted and configured to produce an engineered turbulent and laminar flow of liquid across the face of the filter elements. The engineered turbulent and laminar flow facilitates cleaning of the filter components of the device.

As shown in FIG. 3 influent 302 is introduced to the system 300 through an input manifold 316. The incoming fluid 302 is routed by the input manifold 316 to a location close to the bottom surface 324 of the inner tank 320 to reduce splashing. During operation the rotator assembly, which consists of the inner tank 320 (which has inner tank side walls 322, an inner tank bottom surface 324, and the impeller vanes 328) rotates at a moderate rate, approximately 100 RPM in this embodiment. Influent 302 is accelerated in a circular path by the inner tank 320 of the rotator assembly and the impellers that are a part of bottom surface 324 of the inner tank 320. During the rotation process, the fluid/particulate mix climbs the sides of the rotator assembly. As the fluid is traveling up the side of the rotator assembly, fluid is forced through the filters 306 that form the sidewalls by the pressure created in the rotational motion.

The filtrate that passes through the filters 306 is captured by the clean-side barrier 340. In the meantime, wet solids continue up the sidewalls and are ejected 308 over an upper lip of the rotator sidewall and trapped by the barrier formed by the system outer tank 310. The rotator can be configured such that the rim has an extended lip to prevent backsplash or other contamination of the filtrate.

Filtrate and wet solid sludge are removed 309 from the system through outlet ports 370 and 373. Gravity feeds the fluid and wet solids to the outlet ports.

Continuous back flushing is carried out by the back flush pump 366 and sprayer assembly 360. Water is taken from the processed filtrate sector of the machine. A fine spray is incident on the outside of the filters as they pass the assembly, dislodging any trapped particles that would clog the filter holes. The standpipe 372 above the clean side outlet serves to keep the back flush pump 366 primed by allowing a measured level of filtrate to be retained in the machine during operation raising the fluid level above that of the pump impeller, maintaining priming. Plumbing for the fluid feed to the back flush assembly 364 and 367 and the pass-through's 362 are shown.

The rotator assembly is driven by, for example, a variable speed DC motor 630. The rotator assembly rides on a bearing 318.

Pressure is created by using relatively low RPM spinning of the filter assembly which forces water through the filters (see, Table 1). Pump impellers aid the upward movement of the influent (when required) to push the water up the sides of the filter assembly where the water moves through the filters. Rejected effluent is pushed over the top of the assembly as described above and shown in FIG. 3. Filters are typically made of, for example, screen material. Screen material having nominal opening dimensions of five microns up to two hundred ten microns have been tested as discussed below. In at least some configurations, staged filter assemblies are used when it is advantageous to sequentially remove particulates by size. Filter elements are nested to remove large particles first, feeding filtrate to successively finer screen filters. A cross-flow membrane filtration technique can be employed to create a complex motion of influent past the face of the filters which aids in keeping the filters from clogging. Continuous back-flushing of filters maintains high throughput with no need to interrupt processing for clearing the filters.

Sample Processing Rates include, for example:
60,000 gallons per day (gpd)
250,000 gallons per day (gpd)
2 million gallons per day (mgd)

The goal for recovery of reusable wastewater is a quantity of 80% or more of the volume of influent water.

A filtrate turbidity measurement goal is a measurement of 5 to 10 Nephelometric Turbidity Units (NTU). It should be noted that effluent may be left wet enough to pump away from the system with inexpensive pumps or, alternatively, dried to a larger degree. Customer requirements are as low as 6% solids by weight. Moreover, the device can be designed for industrial or light industrial use. Preventive maintenance (PM) operations, replacement of consumables and the like will be minimized. Downtime is intended to be zero excluding PM's. The modularity of the tool makes it possible to have a backup unit always on hand so the line from the source of effluent will not need to be shut down for PM's.

III. Examples

Static tests of nylon screen indicated that screening with nominal openings larger than 20 microns showed little or no resistance to clean water flow with no significant degradation of throughput when filtering moderately turbid water. Static tests of 10 micron nylon screen with 2% open area strongly restricted clean water flow. More interest existed in the results from the 5 micron screen tests at this time so it was given precedence. The 5 m screen, 1% open area, allowed virtually no clean water flow under gravity alone. The maximum throughput for the beta machine that is reported here is the highest processing rate that allows clear viewing of the machine's operation through a transparent viewing enclosure during processing. Demonstrations will commonly be run at rates as small as one-half of those cited below. Tests indicated that it is possible to process about 20% more influent than the calculated optimum rate without apparent harm to the process or machine. Designed overcapacity of the aforementioned magnitude will accommodate normal variations in influent flow found in many applications.

Example 1

Filter Opening: 20 Microns (μm)

Throughput: 4,000 gph (100,000 gpd)
Flow Rate through Filter: >3,200 gph
Percent Water Recovered: >80%
Filtrate Turbidity Estimate: approx. 500 NTU Example 2

Filter Opening: 11 μm

Throughput: 4,000 gph (100,000 gpd)
Flow Rate through Filter: >3,200 gph
Percent Water Recovered: >80%
Filtrate Turbidity Estimate: <500 NTU Example 3

Filter Opening: 5 μm

Throughput: Target 4,000 gph
Flow Rate through Filter: To be determined
Percent Water Recovered: To be determined
Filtrate Turbidity Estimate: approx. 50 NTU The spillover rate for the five micron test was too high to allow determination of optimum operating parameters. The turbidity result is very promising and more testing will be done soon. Two sets of raw customer wastewater were obtained. Excavation material; wet soil, clay, mud, gravel mix, carwash wastewater. The weight of solids found in the raw samples are compared to the weight of solids in the filtrate produced by processing the wastewater through an 11 micron (nominal) nylon filter screen.

The mounting plate rides on a bearing and is driven by a motor. The nested filter assemblies found in the multi-stage configuration are coaxial and all are attached to the mounting plate. The filter opening sizes, sidewall slope of the rotators holding the filter assemblies, the diameter of each rotator, the height of each rotator and all other dimensions are determined by the application. In addition, the drive motor, drive mechanism and RPM are all matched to each application.

Incoming fluid enters the machine at the top through an intake manifold as discussed above with respect to FIG. 6. Often this manifold can contain a turbine that wholly or partially powers the rotation of the machine. Mixing of the influent is actively encouraged by creating some turbulence as the fluid enters the machine. This mixing improves the separation of wet solids and filtrate when the influent flows across the filter elements in a laminar fashion.

The unique design moves fluid across the face of the filter elements at an angle to help prevent clogging. The laminar fluid motion tends to push the particles across the face of the filter and not embed the particles within the filter. Back-flushing of the filter elements is used as needed to keep the filters in continuous operation.

The fluid filter can adjust the degree of wetness of the effluent through a wide range of choices. The wetness is typically expressed in units of "percent solids by weight".

The rotator assembly employs pump vanes that are sized to push the liquid mixture across the filters and over the top at the rate appropriate for the application. A critical design element is the "dwell time" or the time that the water spends over the face of the filter element. Adjusting this time is done by carefully sizing the pump vanes and the rotational speed (RPM) used to drive the assembly.

As stated above, all of the components of the fluid filter are matched to the application. Clearly the size of the pump vanes and the size of the filter openings must also be carefully chosen.

The entire unit can be housed in an enclosure that is matched to the size of the machine. The exiting air is routed to a scrubber to remove unpleasant odors (as applicable).

Overall dimensions of modular units can vary, for example, from approximately three feet in diameter to approximately eight feet in diameter across a first axis and a second axis. The shape of the machine enclosure is typically cylindrical. The height can range from approximately two feet to approximately eight feet across a third axis. External connections and plumbing are not typically included in the dimensions and can be unique to each installation.

The filter elements are matched to each application. Considerations include abrasive content of the influent, pH of the influent, maximum size desired for particles remaining in filtrate, required level of BOD (Biological Oxygen Demand) in filtrate, turbidity of filtrate (NTU) and throughput. Filter elements are often screens made of plastic or metal material but almost any modern filtration product such as micro fiber, mesh, paper or sintered metals can be used.

In each module, the surface area needed for filter materials on each rotator ranges from a minimum of approximately four square feet up to approximately two hundred square feet. These surface areas are heavily dependent on application and the size of the openings in the filter material.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:
1. A fluid filtering method comprising:
providing an inner tank, an outer tank, and a barrier between the inner tank and the outer tank, the inner tank having a slope from a first diameter near a lower edge to a second diameter near an upper edge that is larger than the first diameter, and the inner tank including a filter;

introducing an influent into the inner tank near a bottom surface of the inner tank, the bottom surface adjacent the lower edge;

spinning the inner tank to move the influent across a face of the filter and separate a filtrate passing through the filter from an effluent climbing the slope of the inner tank and ejecting out of the inner tank near the second diameter; and continuously back-flushing the inner tank while the influent is within the inner tank.

2. The method of claim 1 wherein providing the inner tank includes providing the inner tank with an extended lip to prevent backsplash.

3. The method of claim 1 wherein spinning the inner tank to move the influent across the face of the filter includes creating a laminar flow of the influent across the filter.

4. The method of claim 1 wherein spinning the inner tank to move the influent across the face of the filter includes creating a turbulent flow of the influent across the filter.

5. The method of claim 1 wherein continuously back-flushing the inner tank includes continuously back-flushing the inner tank with a spray nozzle located between the inner tank and the barrier.

6. A fluid filtering method comprising:
providing an inner tank, an outer tank, and a barrier between the inner tank and the outer tank, the inner tank having a slope from a first diameter near a lower edge to a second diameter near an upper edge that is larger than the first diameter, and the inner tank including a filter;

introducing an influent into the inner tank near a bottom surface of the inner tank, the bottom surface adjacent the lower edge;

spinning the inner tank to move the influent across a face of the filter and separate a filtrate passing through the filter from an effluent climbing the slope of the inner tank and to ejecting out of the inner tank near the second diameter, the filtrate passing into a space between the inner tank and the barrier, the effluent ejecting into a space between the barrier and the outer tank; and continuously back-flushing the inner tank with the filtrate while the influent is within the inner tank.

7. The method of claim 6 wherein providing the inner tank includes providing the inner tank having pump veins formed on the bottom surface.

8. The method of claim 6 wherein providing the inner tank including the filter includes providing the inner tank including the filter formed as an integral piece of a side wall of the inner tank.

9. The method of claim 6 wherein providing the inner tank including the filter includes providing the inner tank having a lip holding the filter, the filter covering an aperture within the inner tank.

10. A fluid filtering system comprising:
an inner tank, the inner tank having a slope from a first diameter near a lower edge to a second diameter near an upper edge that is larger than the first diameter, and the inner tank including a cross-flow filter;
an outer tank;
a barrier between the inner tank and the outer tank;
an input manifold positioned above the inner tank near a bottom surface of the inner tank and configured to introduce an influent into the inner tank near the bottom surface, the bottom surface adjacent the lower edge, the inner tank configured to spin and to move the influent across a face of the cross-flow filter and thereby separate a filtrate passing through the cross-flow filter from an effluent climbing the slope of the inner tank and ejecting out of the inner tank near the second diameter; and
a continuous back-flush sprayer assembly at least partially directed towards the inner tank and operable while the influent is within the inner tank.

11. The system of claim 10 wherein the inner tank includes an extended lip to prevent backsplash.

12. The system of claim 10 wherein the inner tank is configured to create a laminar flow of the influent across the cross-flow filter.

13. The system of claim 10 wherein the inner tank is configured to create a turbulent flow of the influent across the cross-flow filter.

14. The system of claim 10 wherein the continuous back-flush sprayer assembly includes a spray nozzle located between the inner tank and the barrier.

15. The system of claim 10 wherein:
the inner tank and the barrier having a space therebetween for capturing the filtrate;
the outer tank and the barrier having a space therebetween for capturing the effluent; and
the continuous back-flush sprayer assembly is configured to continuously backflush the inner tank with the filtrate.

16. The system of claim 10 wherein the inner tank includes pump veins formed on the bottom surface.

17. The system of claim 10 wherein the cross-flow filter is an integral piece of a side wall of the inner tank.

18. The system of claim 10 wherein the inner tank has a lip for holding the cross-flow filter, and the cross-flow filter covers an aperture within the inner tank.

* * * * *